US012583157B2

(12) United States Patent
Mitani

(10) Patent No.: US 12,583,157 B2
(45) Date of Patent: Mar. 24, 2026

(54) MOLD CLAMPING DEVICE, INJECTION MOLDING MACHINE, AND OFFSET LOAD INSPECTION METHOD FOR MOLD CLAMPING DEVICE

(71) Applicant: THE JAPAN STEEL WORKS, LTD., Tokyo (JP)

(72) Inventor: Souma Mitani, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 97 days.

(21) Appl. No.: 18/331,299

(22) Filed: Jun. 8, 2023

(65) Prior Publication Data

US 2023/0405899 A1 Dec. 21, 2023

(30) Foreign Application Priority Data

Jun. 15, 2022 (JP) ................................. 2022-096299

(51) Int. Cl.
*B29C 45/66* (2006.01)
*B29C 45/76* (2006.01)
(52) U.S. Cl.
CPC .......... *B29C 45/66* (2013.01); *B29C 45/7653* (2013.01); *B29C 2945/76013* (2013.01); *B29C 2945/76224* (2013.01)
(58) Field of Classification Search
None
See application file for complete search history.

(56) References Cited

U.S. PATENT DOCUMENTS

| | | | | |
|---|---|---|---|---|
| 2009/0004314 | A1* | 1/2009 | Hiraga | B29C 45/5008 |
| | | | | 425/150 |
| 2009/0246306 | A1* | 10/2009 | Yoshida | B29C 45/76 |
| | | | | 425/150 |

FOREIGN PATENT DOCUMENTS

| | | |
|---|---|---|
| JP | 62-121911 U | 8/1987 |
| JP | 5-269748 A | 10/1993 |
| JP | 2004-268312 A | 9/2004 |

OTHER PUBLICATIONS

Ueno JPH05269748A English Translation 1993 (Year: 1993).*
Communication issued on Jan. 16, 2026 by the Japan Patent Office in the corresponding Japanese Patent Application No. 2022-096299.

* cited by examiner

*Primary Examiner* — Jacob T Minskey
*Assistant Examiner* — Adrien J Bernard
(74) *Attorney, Agent, or Firm* — Sughrue Mion, PLLC

(57) ABSTRACT

A mold clamping device includes at least two mold platens and a plurality of rod-shaped members connecting two of the mold platens. An offset load detector is provided for at least one of the rod-shaped members at a connection portion between the at least one of the rod-shaped members and at least one of the mold platens. The offset load detector is configured to detect loads at two or more different detection positions, respectively, in a circumferential direction of the at least one of the rod-shaped members.

20 Claims, 5 Drawing Sheets

MOLD CLAMPING DEVICE, INJECTION MOLDING MACHINE, AND OFFSET LOAD INSPECTION METHOD FOR MOLD CLAMPING DEVICE

CROSS-REFERENCE TO RELATED APPLICATIONS

This application is based on and claims priority under 35 USC 119 from Japanese Patent Application No. 2022-096299 filed on Jun. 15, 2022, the entire content of which is incorporated herein by reference.

TECHNICAL FIELD

The present disclosure relates to a mold clamping device in which two mold platens are connected by a plurality of rod-shaped members; an injection molding machine; and a method of inspecting an offset load acting on the mold platens of the mold clamping device.

BACKGROUND

An injection molding machine or a pressing machine includes a mold clamping device for clamping a mold. There are various types of mold clamping devices, and JPH5-269748A discloses a mold clamping device including two mold platens. That is, the mold platens include a fixed platen and a movable platen. The fixed platen and the movable platen are coupled by four sets of ball screw mechanisms, and each of the four ball screw mechanisms is provided with a servo motor. Therefore, when the four servo motors are driven, the four sets of ball screw mechanisms are driven, and the movable platen slides with respect to the fixed platen. That is, the mold is opened and closed.

SUMMARY

In the mold clamping device of this type, during mold clamping, a force received from a vicinity of a center where the mold is provided and forces in an opposite direction received from four corners where the ball screw mechanisms are provided act on the mold platens. A bending moment acts on the mold platens due to an offset load generated by such a couple of forces, and the mold platens are deformed. In a case where a size of the mold is smaller than those of the mold platens, a degree of deformation of the mold platens increases. A bending moment acts on the ball screw mechanisms due to the deformation of the mold platens, and the ball screw mechanisms are also deformed. If the deformation is large, the ball screw mechanisms may be deteriorated at an early stage. Magnitude of the bending moment acting on the mold platens or the ball screw mechanisms correlates with magnitude of the offset load acting on the mold platens. If the magnitude of the offset load can be appropriately evaluated, such a problem can be prevented in advance, but there is no appropriate evaluation means in the mold clamping device.

Illustrative aspects of the present disclosure provide a mold clamping device including a detector configured to detect magnitude of an offset load acting on a mold platen.

Other objects and new features of the present disclosure will be apparent from the following descriptions and the accompanying drawings.

One illustrative aspect of the present disclosure provides a mold clamping device including at least two mold platens and a plurality of rod-shaped members connecting two of the mold platens. An offset load detector is provided for at least one of the rod-shaped members at a connection portion between the at least one of the rod-shaped members and the at least one of the mold platens. The offset load detector is configured to detect loads at two or more different detection positions, respectively, in a circumferential direction of the at least one of the rod-shaped members.

According to the present disclosure, the magnitude of the offset load acting on the mold platen or the ball screw mechanism can be detected.

DETAILED DESCRIPTION

Hereinafter, illustrative embodiments will be described in detail with reference to the drawings. However, the present invention is not limited to the following illustrative embodiments. In order to clarify the description, the following description and the drawings are simplified as appropriate. The same symbols are assigned to the same elements throughout the drawings, and duplicated description is omitted as necessary. In addition, hatching may be omitted to avoid complicating the drawings.

First Illustrative Embodiment

{Injection Molding Machine According to First Illustrative Embodiment}

Figure 1:
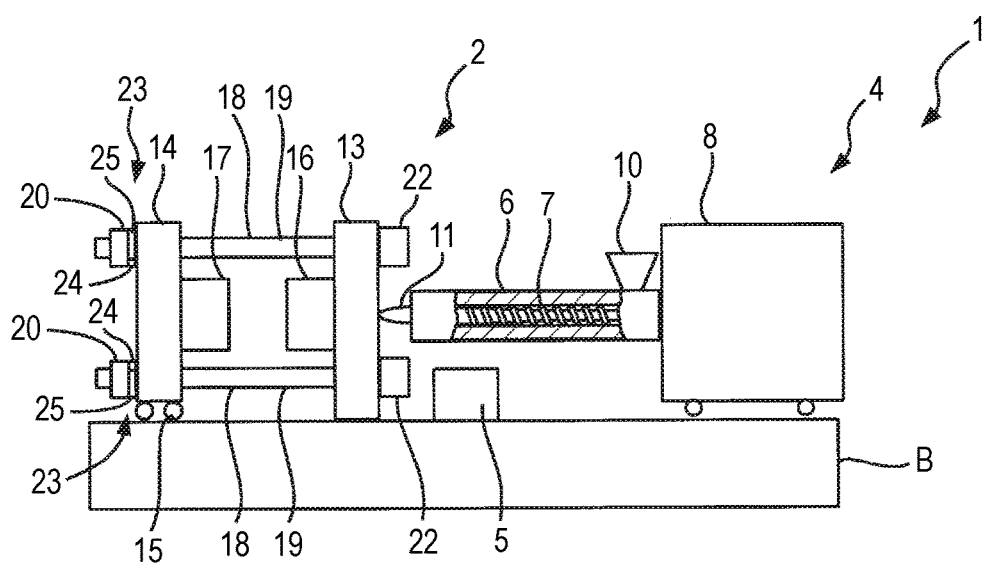
FIG. 1 is a front view showing an injection molding machine according to a first illustrative embodiment.

As shown in FIG. 1, an injection molding machine 1 according to a first illustrative embodiment includes a mold clamping device 2 provided on a bed B, an injection device 4, and a control device 5 configured to control the mold clamping device 2 and the injection device 4.

{Injection Device}

The injection device 4 includes a heating cylinder 6, a screw 7 inserted in the heating cylinder 6, and a screw drive device 8 configured to drive the screw 7. The heating cylinder 6 is provided with a hopper 10. An injection nozzle 11 is provided at a tip end of the heating cylinder 6. When an injected material is fed from the hopper 10 and then is melted by rotating the screw 7, the injected material is metered at a tip end of the screw 7. When the screw 7 is driven in an axial direction thereof, the injected material is injected.

{Mold Clamping Device}

Figure 2:
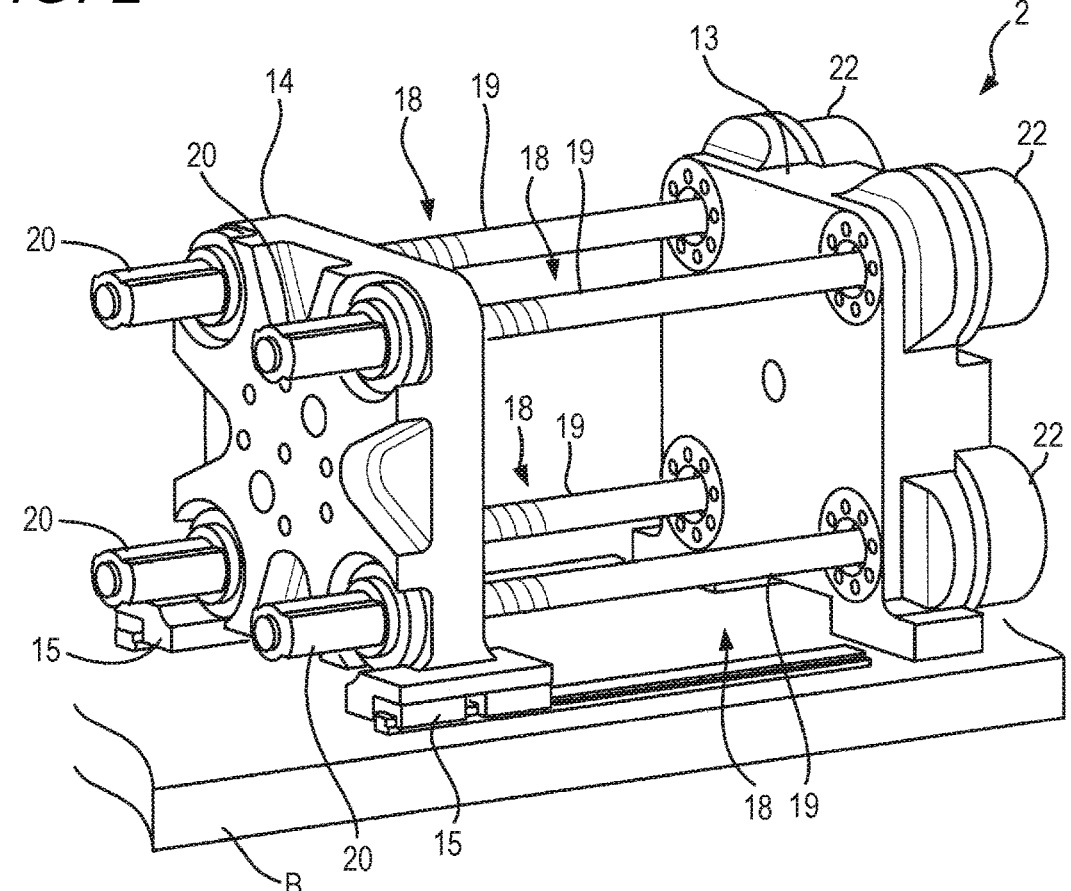
FIG. 2 is a perspective view showing a mold clamping device according to the first illustrative embodiment.

The mold clamping device 2 according to the first illustrative embodiment is a so-called two-platen mold clamping device. That is, as shown in FIG. 2, the mold clamping device 2 includes two mold platens 13, 14, that is, the fixed platen 13 and the movable platen 14. The fixed platen 13 is fixed on the bed B. The movable platen 14 is placed on linear guides 15, 15 provided on the bed B. That is, the movable platen 14 is slidable in directions approaching and separating from the fixed platen 13. As shown in FIG. 1, a fixed-side mold 16 is attached to the fixed platen 13, and a movable-side mold 17 is attached to the movable platen 14.

In the mold clamping device 2 according to the first illustrative embodiment, the two mold platens 13, 14, that is, the fixed platen 13 and the movable platen 14 are connected by four rod-shaped members, that is, four sets of ball screw mechanisms 18, 18, . . . . The ball screw mechanisms 18, 18, . . . include ball screws 19, 19, . . . and ball nuts 20, 20, . . . attached to the ball screws 19, 19, . . . , respectively.

Although not shown in FIG. 2, through holes are formed in the movable platen 14, and the ball nuts 20, 20, . . . are fixed to the respective through holes. That is, one ends of the ball screws 19, 19, . . . are connected to the movable platen 14 via the ball nuts 20, 20, . . . , respectively. The other ends of the ball screws 19, 19, . . . penetrate the fixed platen 13 and are rotatably supported with respect to the fixed platen 13. The fixed platen 13 is provided with servo motors 22, 22, . . . , which are connected to the ball screws 19, 19, . . . , respectively. Therefore, when the servo motors 22, 22, . . . are driven, the ball screws 19, 19, . . . rotate and the movable platen 14 slides. That is, the molds 16, 17 (see FIG. 1) are opened and closed.

{Offset Load Detector}

Figure 3:
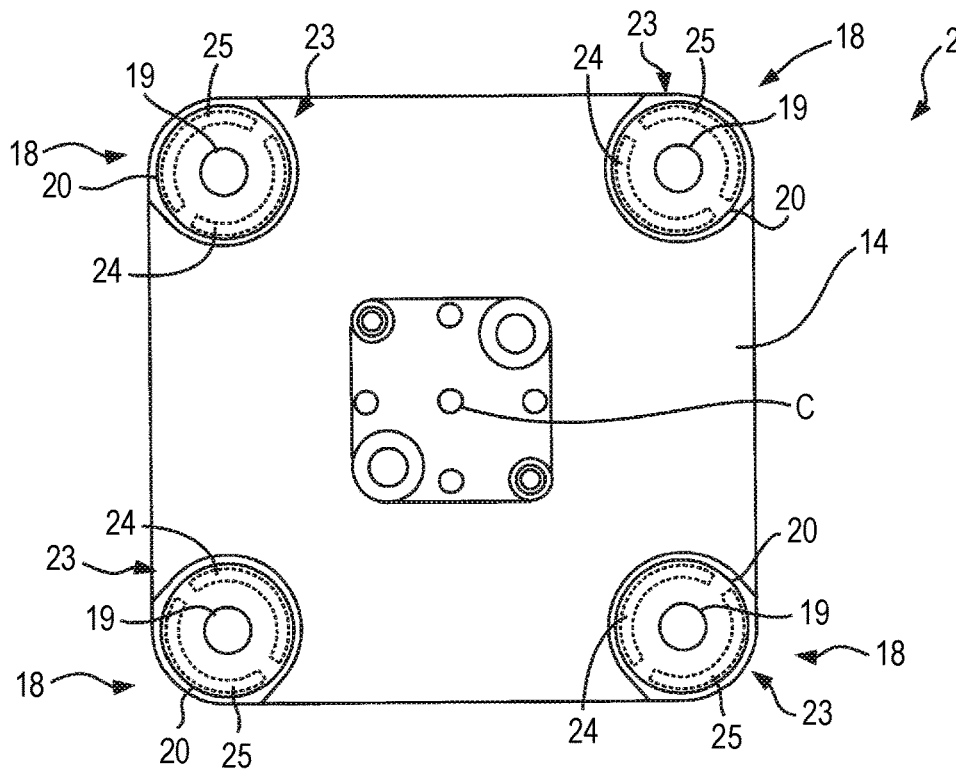
FIG. 3 is a plan view of a movable platen according to the first illustrative embodiment.

As shown in FIG. 1, the mold clamping device 2 according to the first illustrative embodiment includes offset load detectors 23, 23, . . . configured to detect an offset load acting on the mold platens 13, 14 or the ball screw mechanisms 18, 18, . . . . The offset load detectors 23, 23, . . . are provided respectively at connection portions between the rod-shaped members, that is, the ball screw mechanisms 18, 18, . . . , and the mold platen, that is, the movable platen 14. As shown in FIG. 3, the offset load detectors 23, 23, . . . respectively include load cells 24, load cells 24, 25, . . . provided between the movable platen 14 and the ball nuts 20, 20, . . . , Although the load cells 24, 25, the load cells 24, 25, . . . are not visually recognized from the outside, the load cells 24, 25, the load cells 24, 25 are schematically shown in FIG. 1.

One of the offset load detector 23 is configured by one pair of load cells 24, 25. As shown in FIG. 3, the load cells 24, 25 are disposed at two different detection positions in a circumferential direction of one ball screw mechanism 18. More specifically, the load cell 24, which is one of the load cells 24, 25, is provided on a side of the ball screw mechanism 18 close to a center C of the movable platen 14, that is, at an inner detection position, and the load cell 25, which is another one of the load cells 24, 25, is disposed on a side far from the center C, that is, at an outer detection position. The offset load detector 23 including a pair of load cells 24, 25 is configured to detect an offset load as will be described below.

{Operation of Mold Clamping Device}

Figure 4:
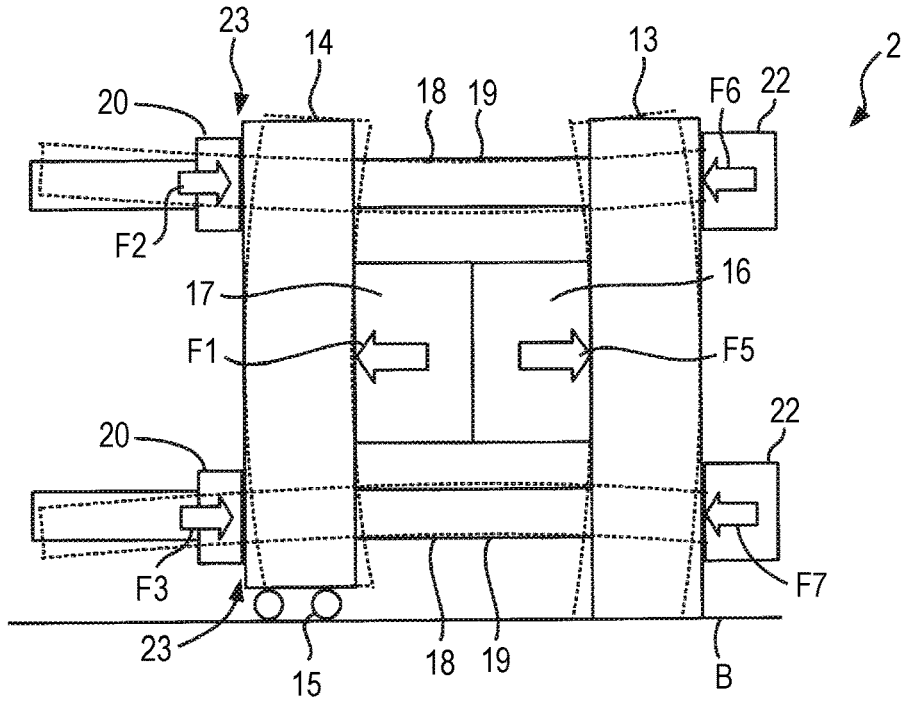
FIG. 4 is a front view of the mold clamping device according to the first illustrative embodiment.

As shown in FIG. 4, the molds 16, 17 in the mold clamping device 2 are clamped. Then, the movable platen 14 is applied with a force F1 from the movable-side mold 17, and is applied with forces F2, F3 from the ball screw mechanisms 18, 18, respectively. As a result, the movable platen 14 is slightly deformed as indicated by a dotted line. Similarly, the fixed platen 13 is applied with a force F5 from the fixed-side mold 16, is applied with forces F6, F7 from the ball screw mechanisms 18, 18, respectively, and is slightly deformed as indicated by a dotted line. By the deformation of the movable platen 14 and the fixed platen 13, the ball screws 19, 19 are also deformed as indicated by dotted lines.

The offset load detector 23 (see FIG. 3) according to the present illustrative embodiment is configured to detect an offset load, which is generated by the deformation, by the pair of load cells 24, 25. Specifically, a load detected by the inner load cell 24 is larger than a load detected by the outer load cell 25, and magnitude of the offset load is detected by detecting the difference.

{Offset Load Inspection Method}

The mold clamping device 2 (see FIG. 1) according to the first illustrative embodiment performs an offset load inspection method of inspecting the magnitude of the offset load by the control device 5 during mold clamping. This will be described. When a mold clamping step is started in the mold clamping device 2, the control device 5 performs processing shown in FIG. 5. That is, the control device 5 executes step S01 to obtain the inner loads detected by the inner load cells 24, 24, . . . in the offset load detectors 23, 23, . . . (see FIG. 3) and the outer loads detected by the outer load cells 25, 25, . . .

Figure 5:
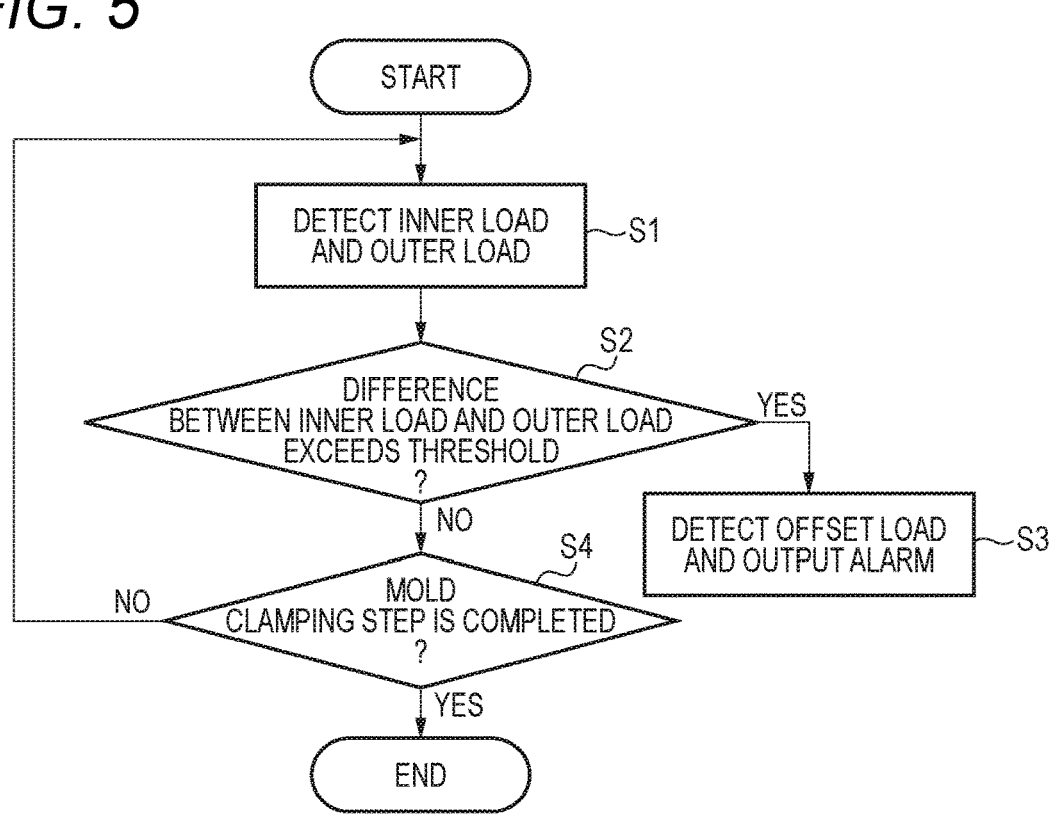
FIG. 5 is a flowchart showing a method of inspecting an offset load that acts during mold clamping in the mold clamping device according to the first illustrative embodiment.

Next, the control device 5 (see FIG. 1) executes step S02 as shown in FIG. 5. That is, the control device 5 calculates a difference between the inner load and the outer load, and determines whether the difference exceeds a threshold set in advance in the control device 5. If the difference exceeds the threshold (YES), the processing proceeds to step S03. In step S03, the control device 5 outputs an alarm indicating that the offset load exceeds an allowable range. On the other hand, when it is determined in step S02 that the difference between the inner load and the outer load does not exceed the threshold, the processing proceeds to step S04. In step S04, the control device 5 determines whether the mold clamping step is completed. If the mold clamping step is not completed (NO in step S03), the processing returns to step S01. On the other hand, if the mold clamping step is completed (YES in step S03), the processing ends.

Second Illustrative Embodiment

Figure 6:
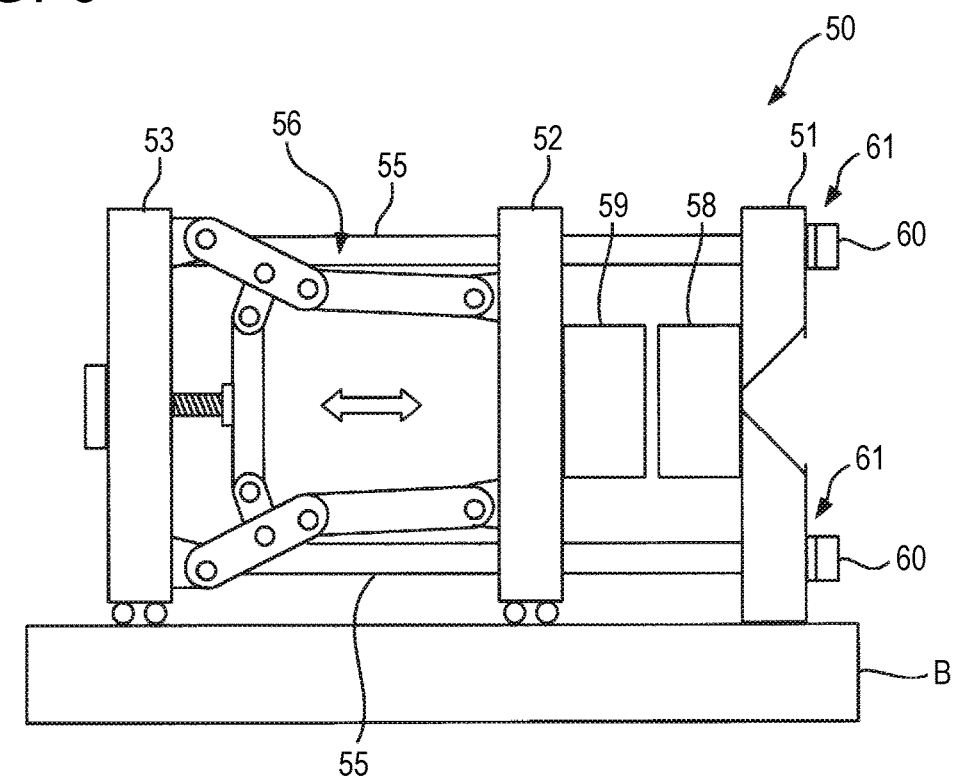
FIG. 6 is a front view showing a mold clamping device according to a second illustrative embodiment.

A second illustrative embodiment will be described. A mold clamping device 50 according to a second illustrative embodiment is shown in FIG. 6. Since an injection device according to the second illustrative embodiment is the same as the injection device 4 of the injection molding machine 1 according to the first illustrative embodiment described with reference to FIG. 1, the description thereof is omitted.

{Mold Clamping Device}

The mold clamping device 50 according to the second illustrative embodiment includes a fixed platen 51 fixed to the bed B, a movable platen 52 slidably provided on the bed B, and a mold clamping housing 53 slidably provided on the bed B. In the illustrative embodiment, the fixed platen 51 and the mold clamping housing 53 are connected by a plurality of tie bars 55, 55, . . . . The movable platen 52 is guided by the tie bars 55, 55, . . . , and a toggle mechanism 56 is provided between the movable platen 52 and the mold clamping housing 53. The fixed platen 51 and the movable platen 52 are respectively provided with a fixed-side mold 58 and a movable-side mold 59. When the toggle mechanism 56 in the mold clamping device 50 according to the second illustrative embodiment is driven, the movable platen 52 slides and can clamp molds 58, 59.

Figure 7:
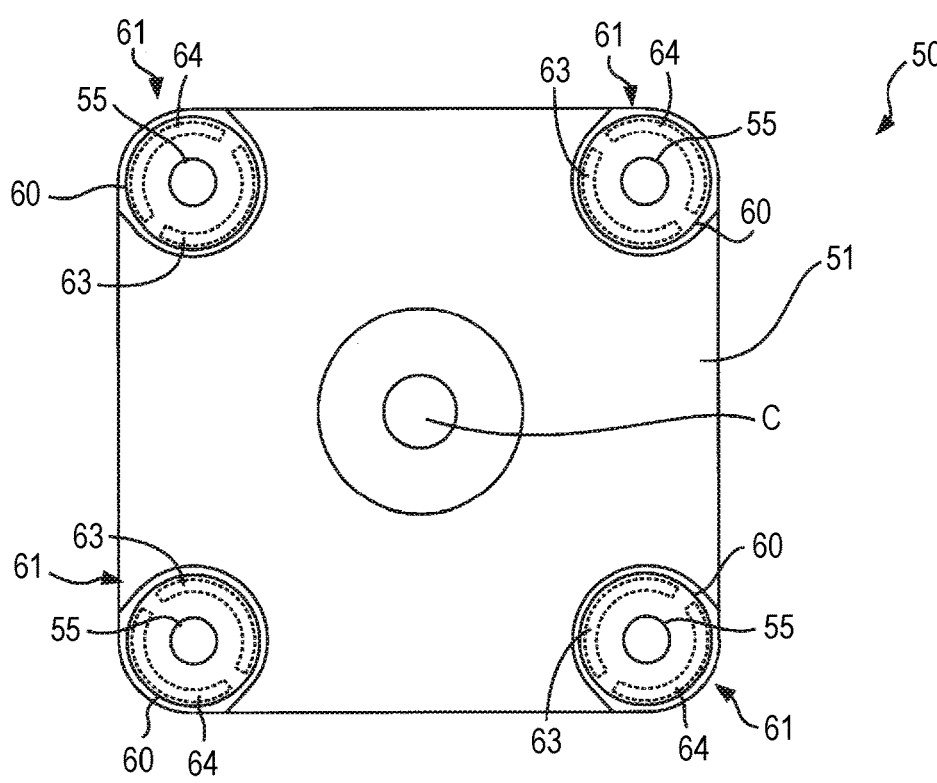
FIG. 7 is a plan view of a fixed platen of the mold clamping device according to the second illustrative embodiment.

In the second illustrative embodiment, the plurality of tie bars 55, 55, . . . are rod-shaped members that connect the two mold platens, that is, the fixed platen 51 and the mold clamping housing 53. In the mold clamping device 50 according to the second illustrative embodiment, offset load detectors 61, 61, . . . are respectively provided at connection portions between the tie bars 55, 55, . . . , which are the rod-shaped members, and one of the mold platens, that is, the fixed platen 51. More specifically, the tie bars 55, 55, . . . are fixed to the fixed platen 51 by clamp nuts 60, 60, . . . , respectively. As shown in FIG. 7, the offset load detectors 61, 61, . . . including pairs of load cells 63, 64, 63, 64, . . . are provided between the fixed platen 51 and the clamp nuts 60, 60, . . . . As in the first illustrative embodiment, a pair of load cells 63, 64 are respectively disposed on an inner side closer to the center C of the mold platen and an outer side. Therefore, the mold clamping device 50 according to the second illustrative embodiment can also detect the offset load during mold clamping.

Modifications

The first illustrative embodiment and the second illustrative embodiment can be variously modified. If a modification of the mold clamping device 2 according to the first illustrative embodiment is shown, it can be easily understood that the same modification can also be made in the second illustrative embodiment, and thus the modifications of the first illustrative embodiment will be described.

{Modification 1}

Figure 8A:
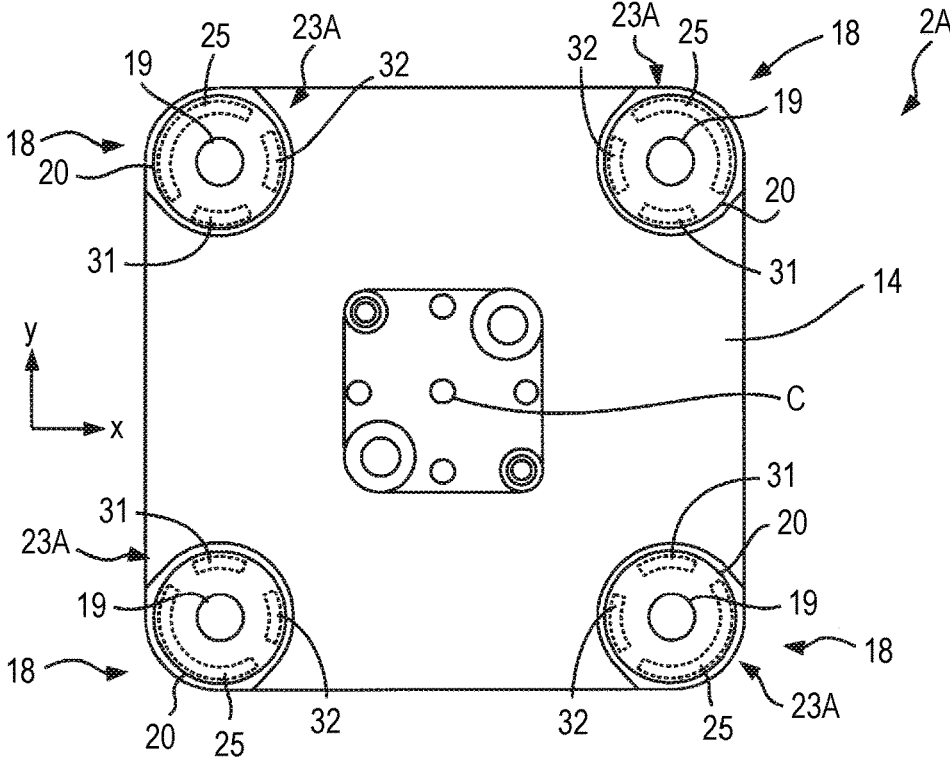
FIG. 8A is a plan view of a movable platen according to Modification 1 of the first illustrative embodiment.

Modification 1 of the mold clamping device 2 according to the first illustrative embodiment will be described. A mold clamping device 2A according to Modification 1 is shown in FIG. 8A. Regarding a configuration of the mold clamping device 2A, parts that are not shown in FIG. 8A are the same as those of the mold clamping device 2 shown in FIGS. 1 and 2, and the description thereof is omitted. In the mold clamping device 2A according to Modification 1, offset load detector 23A is modified. The offset load detector 23A is configured by three load cells 25, 31 and 32. The load cell 25 is disposed on an outer side with respect to the center C of the movable platen 14, and the load cells 31, 32 are disposed on an inner side. The load cells 31, 32 are both disposed on the inner side with respect to the center C of the movable platen 14, but are spaced apart from each other at two different locations in a circumferential direction of the rod-shaped member, that is, the ball screw mechanism 18.

The mold clamping device 2A according to Modification 1 is configured to detect a component in an x direction and a component in a y direction with respect to an offset load generated during the mold clamping. That is, the load cell 32 is configured to detect the component in the x direction together with the load cell 25, and the load cell 31 is configured to detect the component in the y direction together with the load cell 25.

{Modification 2}

Figure 8B:
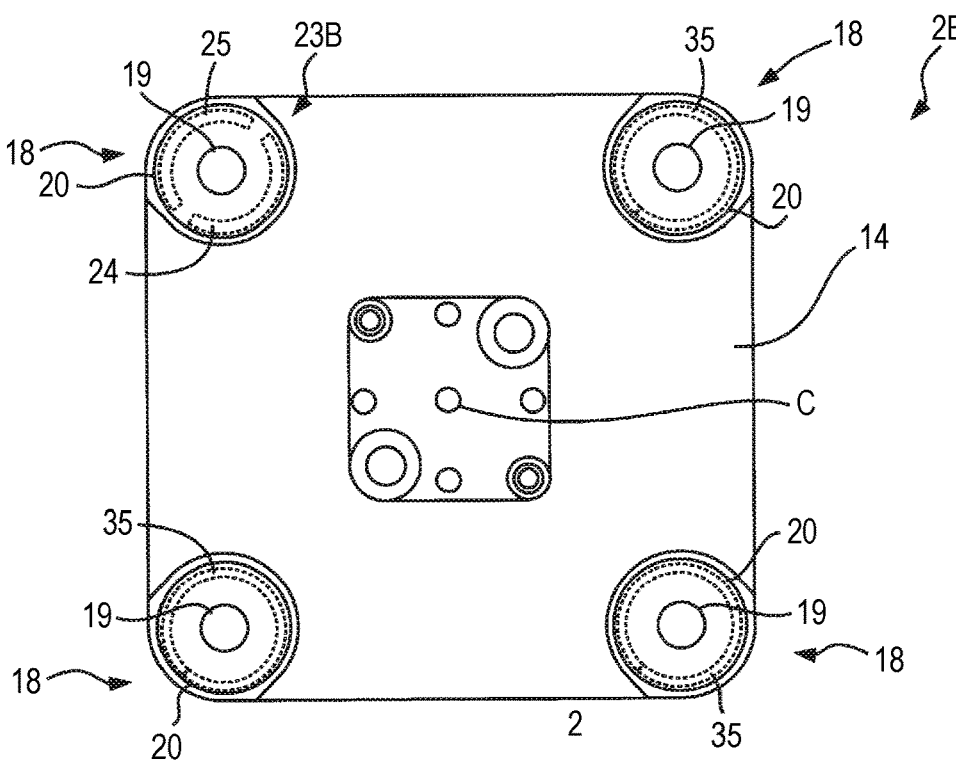
FIG. 8B is a plan view of a movable platen according to Modification 2 of the first illustrative embodiment.

A mold clamping device 2B according to Modification 2 of the first illustrative embodiment is shown in FIG. 8B. Regarding a configuration of the mold clamping device 2B, parts that are not shown in FIG. 8B are the same as those of the mold clamping device 2 shown in FIGS. 1 and 2, and the description thereof is omitted. The mold clamping device 2B according to Modification 2 is characterized in that an offset load detector 23B is provided only on one of the rod-shaped members, that is, one of the ball screw mechanisms 18. Other ball screw mechanisms 18, 18, 18 are provided with only one load cell 35, 35, 35, respectively. These load cells 35, 35, and 35 can detect loads, but cannot detect an offset load. However, by detecting magnitude of the offset load in one ball screw mechanism 18, magnitude of the offset load generated in the other three ball screw mechanisms 18, 18, 18 may be estimated.

{Modification 3}

Figure 8C:
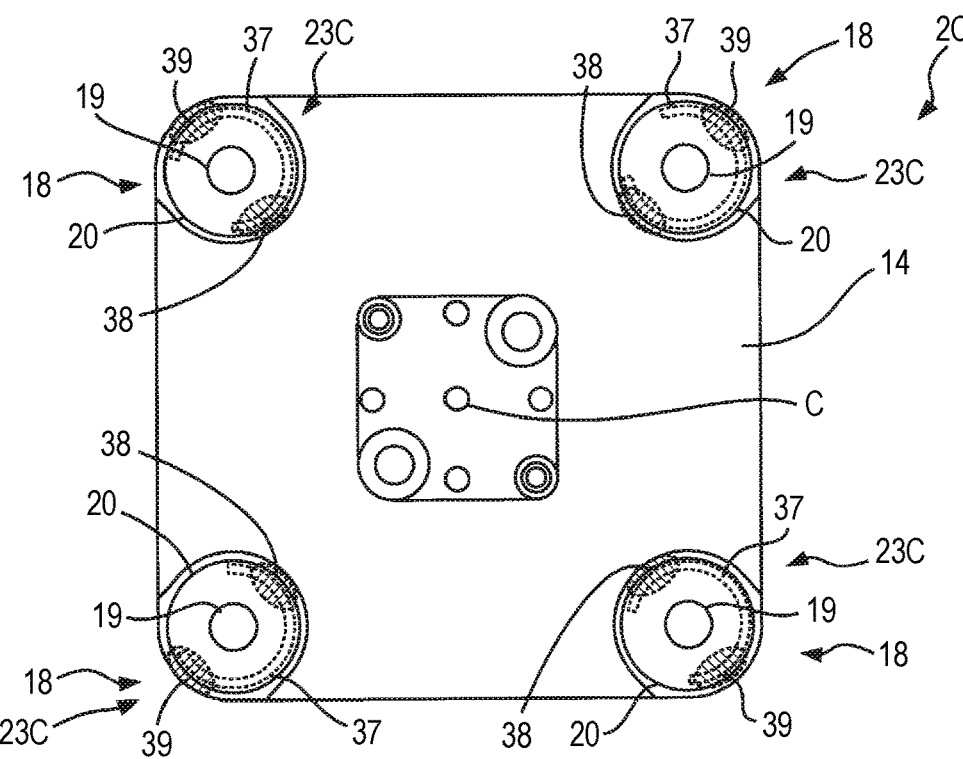
FIG. 8C is a plan view of a movable platen according to Modification 3 of the first illustrative embodiment.

A mold clamping device 2C according to Modification 3 of the first illustrative embodiment is shown in FIG. 8C. Regarding a configuration of the mold clamping device 2C, parts that are not shown in FIG. 8C are the same as those of the mold clamping device 2 shown in FIGS. 1 and 2, and the description thereof is omitted. In the mold clamping device 2C according to Modification 3, offset load detectors 23C, 23C, . . . are configured by one load cell 37, 37, . . . , respectively. Incidentally, the load cells 37, 37, . . . are configured to detect loads at two different detection positions 38, 39, 38, 39, respectively, on a circumference of the rod-shaped member, that is, the ball screw mechanism 18. Therefore, the mold clamping device 2C according to Modification 3 can also detect the offset load during the mold clamping.

{Other Modifications}

The mold platen, on which the offset load detector 23 is provided, can also be modified. In the mold clamping device 2 according to the first illustrative embodiment, the offset load detectors 23, 23, . . . are provided on the movable platen 14. Alternatively, the offset load detectors 23, 23, . . . may be provided on the fixed platen 13.

Although the invention made by the present inventors is specifically described based on the illustrative embodiments, it is needless to say that the present invention is not limited to the illustrative embodiments described above, and various modifications can be made without departing from the scope of the invention. A plurality of examples described above may be implemented in combination as appropriate.

What is claimed is:

1. A mold clamping device comprising:

at least two mold platens; and a plurality of rod-shaped members, the plurality of rod-shaped members connecting two of the mold platens, tension being generated in the plurality of rod-shaped members during mold clamping, wherein an offset load detector is provided for at least one of the rod-shaped members at at least one of connection portions between the at least one of the rod-shaped members and the mold platens, and wherein the offset load detector is configured to detect loads at two or more different detection positions, respectively, in a circumferential direction of the at least one of the rod-shaped members.

2. The mold clamping device according to claim 1, wherein the offset load detector is provided for all of the rod-shaped members at at least one of the respective connection portions between the rod-shaped members and the mold platens.

3. The mold clamping device according to claim 1, wherein at least one position of the two or more different detection positions of the offset load detector is disposed on a side of the rod-shaped member facing a center of the one mold platen, and another one of the two or more different detection positions is disposed on a side of the rod-shaped member away from the center of the one mold platen.

4. The mold clamping device according to claim 1,
   wherein each of the rod-shaped members includes a ball
      screw,
   wherein a ball nut attached to the ball screw is provided
      on one of the two mold platens, and
   wherein a servo motor, which is configured to rotate the
      ball screw, is provided on the other of the two mold
      platens.

5. The mold clamping device according to claim 4,
wherein the offset load detector is provided between the ball
nut and the one of the two mold platens.

6. The mold clamping device according to claim 1,
wherein the offset load detector is configured by a load cell.

7. The mold clamping device according to claim 1, further
comprising:
   a control device configured to:
      monitor the respective loads detected at the two or
         more different detection positions of the offset load
         detector; and
      in a case where a difference between the loads exceeds
         a threshold set in advance, determine that there is an
         abnormality.

8. An injection molding machine comprising:
a mold clamping device configured to clamp a mold; and
an injection device configured to inject an injected mate-
   rial,
   wherein the mold clamping device comprises:
      at least two mold platens; and
      a plurality of rod-shaped members,
   wherein the plurality of rod-shaped members connects
      two of the mold platens, tension being generated in the
      plurality of rod-shaped members during mold clamp-
      ing,
   wherein an offset load detector is provided for at least one
      of the rod-shaped members at at least one of connection
      portions between the at least one of the rod-shaped
      members and the mold platens, and
   wherein the offset load detector is configured to detect
      loads at two or more different detection positions,
      respectively, in a circumferential direction of the at
      least one of the rod-shaped members.

9. The injection molding machine according to claim 8,
wherein the offset load detector is provided for all of the
rod-shaped members at at least one of the respective con-
nection portions between the rod-shaped members and the
mold platens.

10. The injection molding machine according to claim 8,
wherein at least one position of the two or more different
detection positions of the offset load detector is disposed on
a side of the rod-shaped member facing a center of the one
mold platen, and another one of the two or more different
detection positions is disposed on a side of the rod-shaped
member away from the center of the one mold platen.

11. The injection molding machine according to claim 8,
   wherein each of the rod-shaped members includes a ball
      screw,
   wherein a ball nut attached to the ball screw is provided
      on one of the two mold platens, and,
   wherein a servo motor, which is configured to rotate the
      ball screw, is provided on the other of the two mold
      platens.

12. The injection molding machine according to claim 11,
wherein the offset load detector is provided between the ball
nut and the one of the two mold platens.

13. The injection molding machine according to claim 8,
wherein the offset load detector is configured by a load cell.

14. The injection molding machine according to claim 8,
further comprising:
   a control device configured to:
      monitor the respective loads detected at the two or
         more different detection positions of the offset load
         detector; and
      in a case where a difference between the loads exceeds
         a threshold set in advance, determine that there is an
         abnormality.

15. An offset load inspection method for a mold clamping
device,
   the mold clamping device comprising:
      at least two mold platens; and
      a plurality of rod-shaped members, the plurality of
         rod-shaped members connecting two of the mold
         platens, tension being generated in the plurality of
         rod-shaped members during mold clamping,
   the method comprising:
      at at least one of connection portions between at least
         one of the rod-shaped members and the mold plat-
         ens, detecting loads at two or more detection posi-
         tions, respectively, in a circumferential direction of
         at least one of the rod-shaped members;
      monitoring a difference between the detected loads; and
      in a case a difference between the detected loads
         exceeds a threshold set in advance, determining that
         there is an abnormality.

16. The mold clamping device according to claim 1,
wherein the offset load detector is a first offset load detector,
and
   wherein a second offset load detector and a third offset
      load detector are provided for at least one of the
      rod-shaped members at at least one of connection
      portions between the at least one of the rod-shaped
      members and the mold platens, and
   wherein the second offset load detector is configured to
      detect a component in a x-direction with respect to an
      offset load generated during the mold clamping
      together with the first offset load detector, and the third
      offset load detector is configured to detect a component
      in a y-direction with respect to the offset load generated
      during the mold clamping together with the first offset
      load detector.

17. The mold clamping device according to claim 1,
wherein the offset load detector is configured to detect loads
at two or more different detection positions, respectively,
which are disposed on a same circumference in the circum-
ferential direction of a same rod-shaped member among the
at least one of the rod-shaped members.

18. The mold clamping device according to claim 17,
wherein the offset detector comprises two or more two
discrete load cells provided at the two or more different
positions, where an offset load is calculated based on a
difference between the detected loads detected by the two or
more discrete load cells.

19. The injection molding machine according to claim 8,
wherein the offset load detector is configured to detect loads
at two or more different detection positions, respectively,
which are disposed on a same circumference in the circum-
ferential direction of a same rod-shaped member among the
at least one of the rod-shaped members, and the offset
detector comprises two or more two discrete load cells
provided at the two or more different positions, where an
offset load is calculated based on a difference between the
detected loads detected by the two or more discrete load
cells.

20. The offset load inspection method according to claim 15, wherein the two or more detection positions, respectively, are disposed on a same circumference in the circumferential direction of a same rod-shaped member among the at least one of the rod-shaped members, and the loads at two or more detection positions are detected by two or more two discrete load cells provided at the two or more positions, respectively, where an offset load is calculated based on a difference between the loads detected by the two or more discrete load cells.

\* \* \* \* \*